April 25, 1961 R. F. ROBERSON 2,981,344
PLOW FURROW WHEEL
Filed March 10, 1959 2 Sheets-Sheet 1
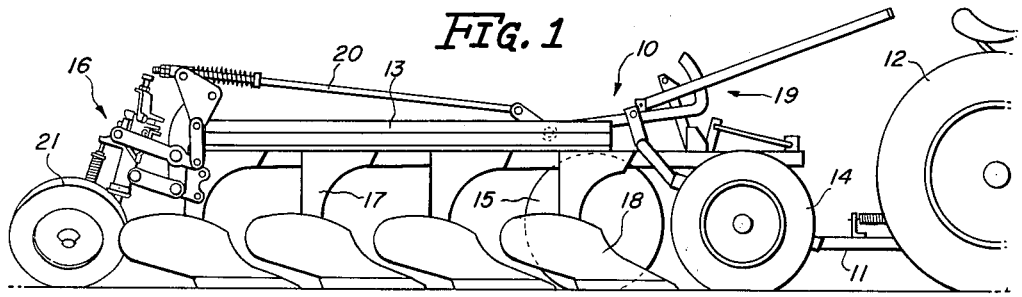
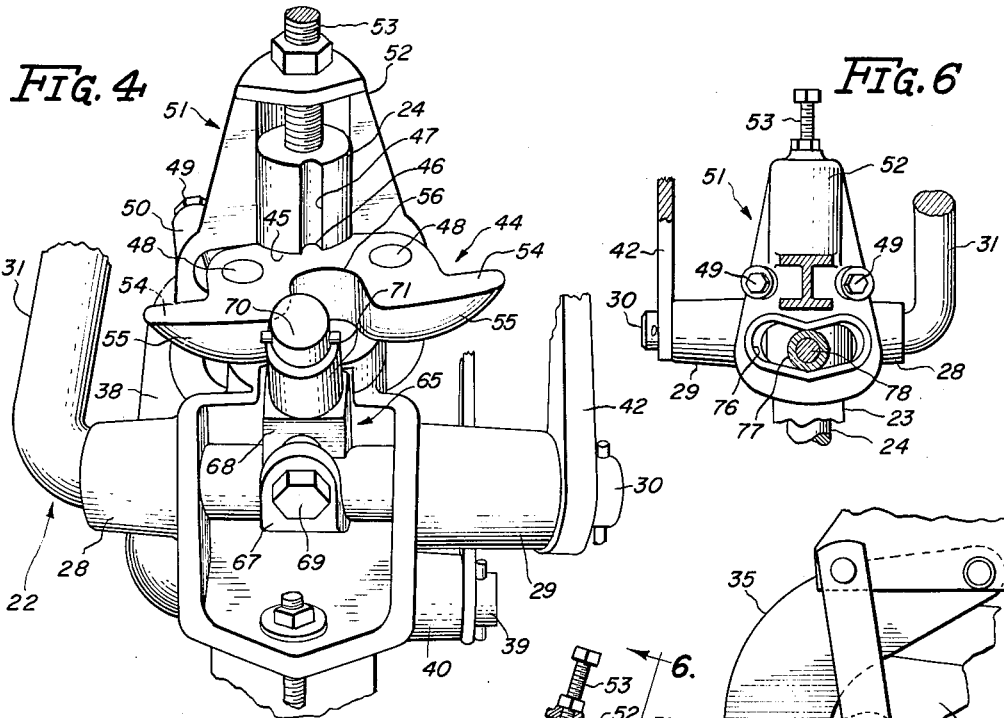
INVENTOR
Raymond F. Roberson
Paul O. Pippel
ATTORNEY April 25, 1961     R. F. ROBERSON     2,981,344
PLOW FURROW WHEEL
Filed March 10, 1959     2 Sheets-Sheet 2
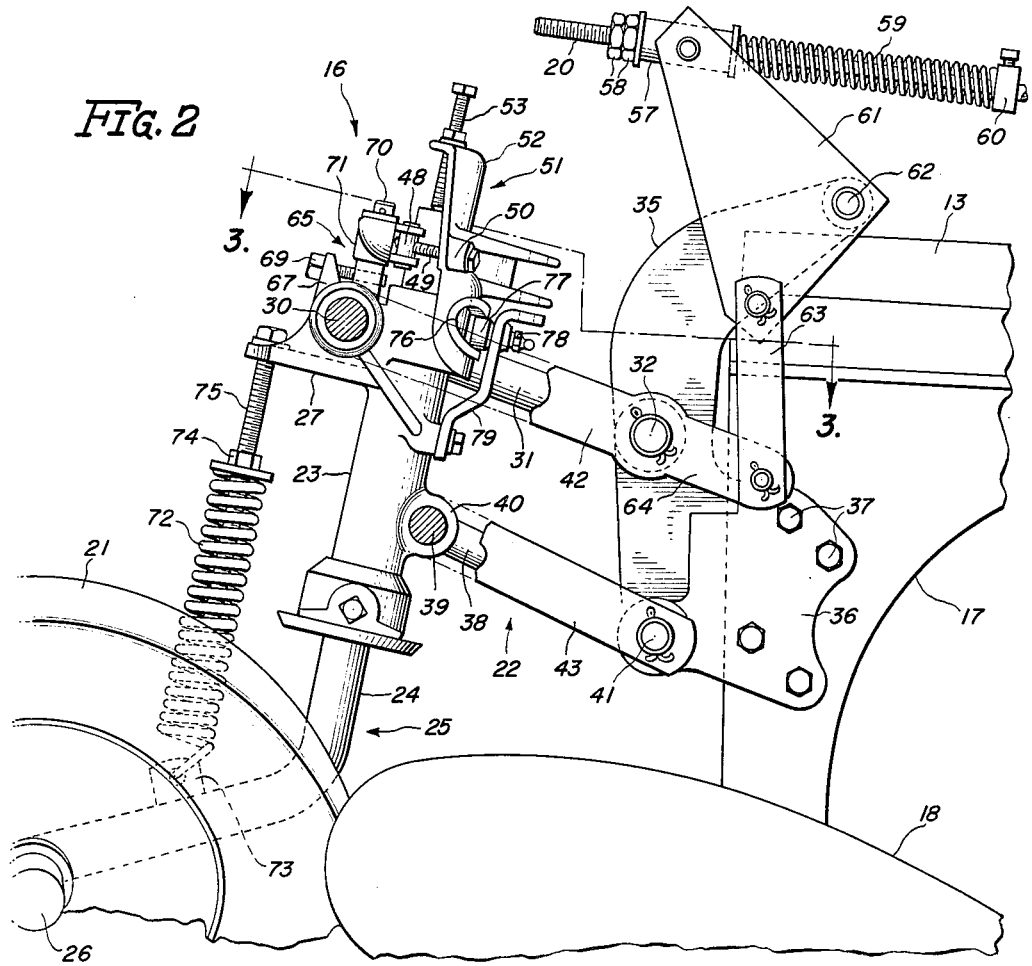
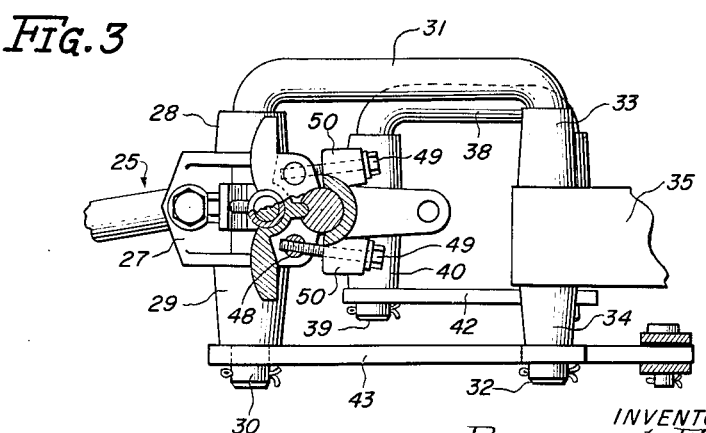
INVENTOR
Raymond F. Roberson
Paul O. Pippel
ATTORNEY

United States Patent Office 2,981,344
Patented Apr. 25, 1961

2,981,344

PLOW FURROW WHEEL

Raymond F. Roberson, Canton, Ill., assignor to International Harvester Company, Chicago, Ill., a corporation of New Jersey Filed Mar. 10, 1959, Ser. No. 798,433

2 Claims. (Cl. 172—386)

This invention relates to agricultural implements and particularly plows and the like. More specifically, the invention concerns a furrow wheel unit for such an implement.

In an implement such as the moldboard plow shown in the drawings, one or more plow bottoms mounted on a mobile frame form a furrow in which the furrow wheel rides in trailing relation. The furrow wheel unit is raised and lowered relative to the plow frame when the latter is vertically moved between operating and transport positions. The trailing characteristics of an implement of this type during transportation thereof behind a propelling vehicle are improved if the furrow wheel is allowed to caster, while it is important that the wheel be prevented from castering during operation of the plow.

The furrow wheel is adapted to ride against the wall of the furrow formed by the earth-working tools to resist side draft forces acting on the plow during operation. The wheel is adapted to follow behind the plow in alinement therewith and with the direction of travel, and resistance to side draft can be increased by laterally angling the wheel relative to a longitudinal vertical plane.

It is a well-known expedient to provide adjustments for the lead of a furrow wheel. It is also well-known to resist or prevent castering of the wheel in transport. However, the operations of adjusting the lead of the wheel and preventing castering thereof have been entirely separate operations independently performed, and when the lead adjustment is made it remains when the plow is transported, interfering with proper trailing of the wheel.

An object of this invention is to provide an improved furrow wheel unit wherein novel means have been devised allowing castering of the wheel, while keeping it in proper alinement, during transport of the plow, and locking the wheel against castering when the plow is lowered to operating position.

Another object of the invention is the provision, in a furrow wheel unit for an implement, of means automatically effective upon lowering the implement to operating position to lock the furrow wheel against castering.

Another object of the invention is the provision of means incorporated in the locking means by which the furrow wheel is held against castering in the operating position of the plow, to adjust the lead angle of the wheel with respect to the furrow wall in operation, while allowing the wheel to caster in the transport position with the wheel in proper alinement with the plow frame and with the direction of travel, and automatically returning the wheel to the selected adjusted lead angle when the plow is returned to operating position.

Other objects and advantages of the invention will become clear from the following detailed description when read in conjunction with the accompanying drawings, wherein:

Fig. 1 is a side view of a 4-bottom moldboard plow connected in trailing relation to a tractor and having mounted on its rear end a furrow wheel unit incorporating the features of this invention;

Fig. 2 is an enlarged view, partly in section, of a portion of the furrow wheel assembly showing its relationship to the plow frame in a position corresponding to the operating position of the plow;

Fig. 3 is a section taken on the line 3—3 of Fig. 2;

Fig. 4 is an enlarged detail in perspective of a portion of the furrow wheel assembly showing the locking means therefor;

Fig. 5 is a partial sectional view similar to Fig. 2 but showing the relationship of the parts in the transport position of the plow; and Fig. 6 is a section taken on the line 6—6 of Fig. 5.

A typical plow with which this invention is concerned is indicated by the numeral 10 and is connected in trailing relation to the drawbar 11 of a tractor 12. The plow 10 comprises a frame 13 supported at its front end by a furrow wheel 14 and a land wheel 15, and at its rear end by a furrow wheel unit 16. To the plow frame 13 are secured a plurality of depending supports 17 to the lower ends of which are secured plow bottoms 18.

The details of construction of the plow 10, other than the furrow wheel unit 16, form no part of this invention. Further, the tool-supporting frame 13 is raised and lowered with respect to the ground-engaging wheels by conventional lifting apparatus 19, also forming, per se, no part of this invention, but adapted to move the front wheels 14 and 15 vertically relative to the plow frame and to transmit lifting motion through a rod 20 to the furrow wheel unit 16 at the rear.

The furrow wheel unit 16 includes a wheel 21 and a supporting structure therefor designated by the numeral 22 comprising, a housing 23 adapted to rotatably receive the generally vertically upwardly extending spindle portion 24 of an axle 25 having its lower end bent rearwardly and terminating in a laterally bent, downwardly inclined stub 26 upon which is mounted the furrow wheel 21 adapted to roll in the furrow formed by the plow bottoms 18 in alinement with the direction of travel. While the path followed by furrow wheel 21 is in alinement with the direction of travel of the plow, means are provided, hereinafter to be described, for laterally angling wheel 21 relative to a longitudinal vertical plane through the wheel or the path of travel thereof to cause the wheel to lead into or away from the furrow wall formed by the plow bottoms.

A rearward extension 27 forming a part of the upper end of housing 23 includes a pair of laterally spaced bearings 28 and 29 in which is received, for relative pivotal movement, a shaft 30 formed by the transversely bent rear end of a link 31, which is U-shaped, and the laterally bent forward end of which is parallel to the shaft portion 30 and forms a pivot 32 adapted for reception in bearings 33 and 34 forming part of a bracket 35, on the lower end of which a pair of plates 36 are formed straddling the rearmost plow standard 17 and affixed thereto by bolts 37.

A lower link 38, generally parallel to upper link 31, has its rear laterally bent end 39 pivotally received in a boss 40 formed on the lower forward portion of housing 23. The forward laterally bent end 41 of link 38 is pivotally connected to the lower end of bracket 35. Another upper link 42 is pivotally connected to the laterally bent ends 30 and 32 of link 31, and another link 43 is pivotally connected to the ends 39 and 41 of link 38.

To the upper end of spindle portion 24 of axle 25 is secured a notched locking member 44 having a recess 45 therein adapted to fit the curvature of spindle portion 24, and having a rib 46 receivable in a groove 47 formed in the spindle portion 24. Member 44 is secured to the spindle 24 by the provision of a pair of vertically extending pins 48 carried by the member 44 and having threaded openings therein to receive laterally spaced bolts 49 extending through openings provided in a pair of bosses 50 formed on a cap 51 provided with a flanged upper portion 52 having a threaded aperture to adjustably receive a bolt 53, the lower end of which is adapted to engage the upper end of spindle portion 24.

Member 44 has a pair of wings 54 the rear faces 55 of which are arcuately shaped, serve as cam faces, and lead into a central notch or recess 56.

Notched member 44 is rotatable with axle 25 about the axis of spindle portion 24 to permit the furrow wheel 21 to caster when the plow is being transported. The furrow wheel unit 16 has been lowered relative to the plow frame 13 in the transport position of the plow, as indicated in Fig. 5. This lowering of the entire wheel assembly 16 is accomplished when rod 20 is moved forwardly by operation of the lifting apparatus 19. Rod 20 has a sleeve 57 slidable thereon and held against displacement by one or more nuts 58 on the threaded end of the rod. The other end of the sleeve is engaged by a coil spring 59 the other end of which abuts a collar 60. Sleeve 60 is pivotally connected to a triangular plate 61 serving as a bellcrank fulcrumed at 62 on an extension of bracket 35, and is also connected to a link 63 the other end of which is connected to a forward extension 64 of link 42. Forward rocking of bellcrank 61 raises link 63 and lowers the furrow wheel assembly 16 relative to the plow frame, thus lifting the rear end of the plow frame to a transport position from the operating position shown in Fig. 2.

As pointed out hereinbefore, the furrow wheel 21 is allowed to caster in the transport position but should be prevented from castering during operation to satisfactorily perform its function. In the operating position the wheel rides against the furrow wall and absorbs side thrust exerted by the soil against the plow bottoms tending to swing the implement laterally. This takes some of the load off of the plow bottom landsides, makes the implement easier to pull, and avoids excessive wear of the landsides. For best results during operation, more or less lead is put into the wheel, and the lead is the angle the wheel makes with respect to a vertical plane through the direction of travel or through the wheel when in alinement with the direction of travel. During transport, of course, for best results the wheel must follow in alinement with the plow, and when the plow is again dropped to operating position the lead, which was automatically taken out of the wheel when the plow was raised to transport, should be automatically resumed.

The furrow wheel is locked against castering during operation by the provision of a locking member 65 in the form of a projection extending radially from shaft section 30 of upper link 31. Member 65 is in the form of a clamp having a socket 66 therein to slidably receive the shaft 30 and including a pair of arms 67 and 68 apertured to receive the threaded shank of a bolt 69 which can be tightened to hold the locking member or projection firmly on the shaft 30 and can be loosened to permit the member 65 to be adjusted laterally. Arm 68 has a reduced diameter extension 70 cylindrical in form upon which is mounted a roller 71.

Due to the relative motion between links 31 and 38 and housing 23 when the parallel links are raised and lowered about their pivot axes 32 and 41 on the plow frame, projecting member 65 on shaft 30, rocks back and forth from the released position of Fig. 5 with the plow in transport, to the locked position of Fig. 2 with roller 71 received in notch or recess 56 in member 44. When the implement is moved to operating position, if the locking member 65 is not in alinement with the notch 56, roller 71 engages one of the cam faces 55 of member 44 which guides the roller into the notch.

Biasing means are provided urging the furrow wheel into alinement with the direction of travel behind the plow effective to yieldably hold the wheel in this position during transport, this biasing means including a coil spring 72 connected at its lower end to a lug 73 on the rearwardly bent portion of axle 25 and having a threaded cap 74 adapted to adjustably receive a threaded bolt 75 anchored at its upper end to the extension 27 of the housing. Furrow wheel 21 thus casters against the action of spring 72 tending to center the wheel.

As shown clearly in Fig. 6, holding wheel 21 in a normal trailed relation behind the plow is facilitated by the provision of a transverse slot 76 in the lower portion of cap 51 having a modified V shape and adapted to slidably receive a roller 77 mounted on a pin 78 secured to the upper end of a bracket 79 secured at its lower end to the housing 23. When roller 77 is in the low point of the slot 76 wheel 21 is centered with respect to the direction of travel of the plow, and since cap 51 rotates with spindle portion 24 of the axle, castering of the wheel causes roller 77 to travel upwardly along one side or other of the slot 76.

Under certain circumstances it is desirable that the furrow wheel be locked against castering in the transport position of the plow and for this reason a pair of ears 80 are provided on cap 51 extending forwardly therefrom and adapted to register with a suitable aperture in bracket 79 to receive a locking pin, not shown.

As pointed out before, it is usually desirable to angle or lead furrow wheel 21 away from the furrow wall during operation, the amount of lead put into the wheel depending upon the side thrust exerted against the plow bottoms 18. Since the plow is frequently raised and lowered during operation, it is also desirable that whatever lead is in the furrow wheel be taken out when the implement is raised but is automatically resumed when the plow bottoms are again dropped to operating position. Therefore, locking part 65 has been made laterally adjustable on the shaft portion 30 of the upper link 31. In Fig. 4 the projection 65 is substantially centered between the bearing portions 28 and 29 and corresponds to a position of the projection which, upon receipt thereof in notch 56, will lock the furrow wheel in alinement with the direction of travel or with a vertical plane therethrough. In order to adjust the furrow wheel to provide a lead therein away from the furrow wall, the operator loosens bolt 69 and slides member 65 to the left on shaft 30 to a position angularly displaced with respect to the axis of spindle portion 24 and with respect to notch or recess 56. Receipt of the member 65 in the notch then angularly adjusts the member 44, axle 25 and wheel 21. The wheel can be led or angled in the opposite direction, if desired, by adjusting the projection 65 to the right, as viewed in Fig. 4, on shaft 30.

From the foregoing it should be clear that while the wheel 21 assumes a lead angle in the operating position thereof and is held in that position by the reception of roller 71 in notch 56, this lead is automatically taken out upon release of the roller 71 from the notch 56 when the implement is raised to transport position, and this lead angle is automatically resumed when the implement is again lowered to operating position and roller 71 received in the notch 56.

The operation of the novel furrow wheel apparatus of this invention should be clearly understood from the foregoing description. It should likewise be understood that the invention has been described in its preferred embodiment only, and that modifications may be made therein without departing from the spirit of the invention or the scope of the appended claims.

What is claimed is:

1. In a furrow wheel assembly for a plow having a frame, an axle carrying a wheel in alinement with the direction of travel, a pair of vertically spaced generally parallel links pivotally connected at one end to the frame for vertical swinging between positions corresponding to operating and transport positions of the plow, a transverse shaft forming part of one of said links, a generally vertically extending housing pivotally mounted on said shaft and adapted to rotatably receive said wheel-carrying axle to accommodate castering thereof in the transport position of the plow, a member having a recess therein secured to said axle, a projection on said shaft in alinement with said axle and movable into said recess by the relative pivoting of said links and said housing when the links are pivoted to lower the plow, said projection in said recess being adapted to hold the axle against rotation and prevent castering of the wheel and said projection being movable out of said recess when the plow is raised, and means for laterally adjusting the position of the projection on said shaft out of alinement with said axle, whereby, upon receipt of said projection in said recess the axle is angularly adjusted and the wheel is angled relative to the line of travel.

2. In a furrow wheel assembly for a plow having a frame, an axle carrying a wheel in alinement with the direction of travel, a pair of vertically spaced generally parallel links pivotally connected at one end to the frame for vertical swinging between positions corresponding to operating and transport positions of the plow, a transverse shaft forming part of one of said links, a generally vertically extending housing pivotally mounted on said shaft and adapted to rotatably receive said wheel-carrying axle to accommodate castering thereof in the transport position of the plow, a member having a recess therein secured to said axle, a projection on said shaft in alinement with said axle and movable into said recess by the relative pivoting of said links and said housing when the links are pivoted to lower the plow, said projection in said recess being adapted to hold the axle against rotation and prevent castering of the wheel and said projection being movable out of said recess when the plow is raised, means for laterally adjusting the position of the projection on said shaft out of alinement with said axle, whereby, upon receipt of said projection in said recess the axle is angularly adjusted and the wheel is angled relative to the line of travel, and means on said member facilitating reception of the projection in said recess irrespective of the position of adjustment thereof on the shaft.

References Cited in the file of this patent

UNITED STATES PATENTS

| | | |
|---|---|---|
| 1,489,467 | Strandlund | Apr. 8, 1924 |
| 1,865,598 | Verity | July 5, 1932 |
| 2,340,495 | Strandlund | Feb. 1, 1944 |
| 2,353,659 | Frank | July 18, 1944 |
| 2,384,406 | Strandlund | Sept. 4, 1945 |
| 2,433,148 | Orelind et al. | Dec. 23, 1947 |
| 2,697,394 | Fyke | Dec. 21, 1954 |
| 2,706,940 | Oerman | Apr. 26, 1955 |